Figure 1:
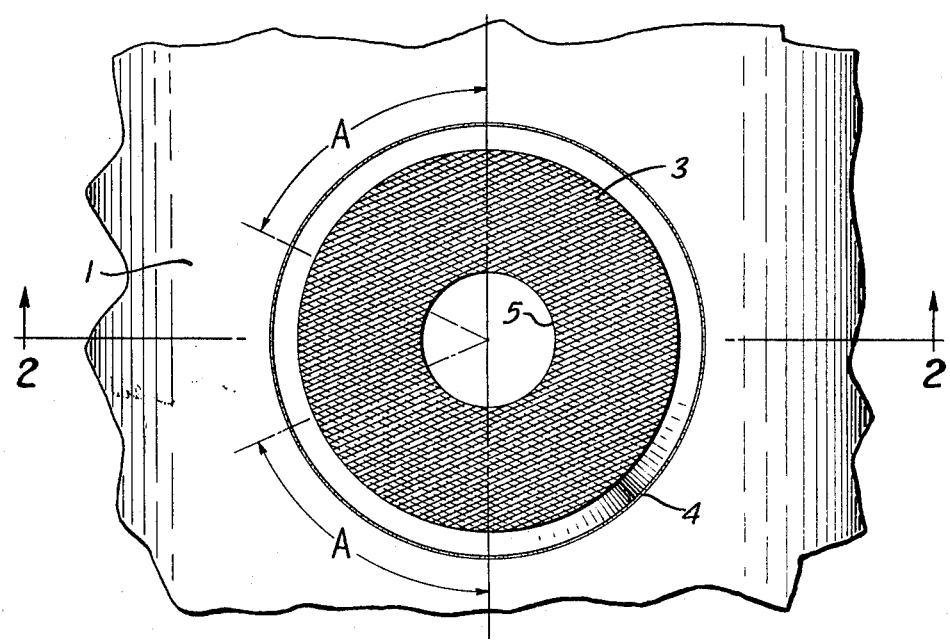

July 30, 1968     D. J. BARON ET AL     3,394,738

FILAMENT WOUND VESSEL

Filed May 20, 1966

INVENTORS.
DAVID J. BARON
STANLEY S. H. CHEN
BY
Andrus & Starke
ATTORNEYS

3,394,738
FILAMENT WOUND VESSEL

David J. Baron, Milwaukee, and Stanley S. H. Chen, Madison, Wis., assignors to A. O. Smith Corporation, Milwaukee, Wis., a corporation of New York
Filed May 20, 1966, Ser. No. 551,608
10 Claims. (Cl. 138—177)

This invention relates to a filament wound tubular member and more particularly to a reinforcement for an opening in a filament wound vessel.

Filament wound vessels are generally fabricated by winding a resin impregnated fibrous strand around a mandrel in a generally helical pattern in a number of superimposed layers. In some cases, the strand is wound over rounded or curved ends on the mandrel to form the heads of the vessel integral with the cylindrical wall or shell. In other cases, the heads are formed separately and are secured by an adhesive within the open ends of the helically wound cylindrical shell.

Openings are normally provided in the shell or heads for fittings used for the introduction and removal of fluids or for the insertion of instruments or nozzles. The openings are normally made by cutting out the structural filamentary material after the vessel has been fabricated and cured. Since the stress resulting from internal pressure results in tension loads in the fibrous material of which the shell or wall of the vessel is composed, the holes cut in the wall will sever the load carrying filaments so that suitable means must be provided for transmitting the tension loads around the cut openings. Without means for transmitting the tension loads around the openings, the wall of the vessel would be greatly weakened in the area surrounding the opening.

In the past, fibrous patches bonded with a thermosetting resin have been applied to a vessel wall surrounding the openings therein as described in United States Patent 3,106,940. According to this patent, one or more circumferentially wound annular patches are positioned in alignment with the location of the opening to be formed in the vessel wall and additional layers of the fibrous material are then wound or laid up over the path. In the final cured vessel, the patch is embedded within the wall of the vessel, and the opening is then cut through the patched area.

The present invention is directed to an improved reinforcing construction for an opening in a cylindrical wall of a filament wound vessel. According to the invention, a fiber reinforced resin patch is applied to the wall of the vessel by an adhesive and the patch is provided with a central opening which is aligned with the opening in the vessel wall. The patch is formed of generally straight, reinforcing fibers in superimposed layers bonded together by a thermosetting resin. All of the fibers of the patch are disposed at an angle of about 63° to 69° with respect to the longitudinal axis of the cylindrical wall of the tank. Furthermore, the diameter of the patch is at least three times the diameter of the opening in the vessel wall and the thickness of the patch is at least twice the wall thickness of the vessel. As a further consideration, the edges or periphery of the patch should be tapered at an angle of about 45° to reduce stress concentrations about the edge.

The present invention provides a simple and inexpensive reinforcement structure for an opening in the wall of a cylindrical filament wound vessel. The patch formed in the manner of the invention provides substantial rinforcement for the opening to transmit tension loads around the cut opening and prevent areas of weakness in the vessel wall.

Other objects and advantages will appear in the course of the following description.

The drawings illustrate the best mode presently contemplated of carrying out the invention.

Figure 2:
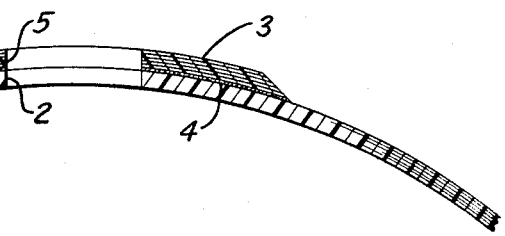

In the drawing:

FIG. 1 is a plan view of a vessel having an opening reinforced by the patch of the invention and the dashed line indicating the longitudinal center line of the vessel; and FIG. 2 is a section taken along lines 2—2 of FIG. 1.

The drawings illustrate a cylindrical wall 1 of a vessel or tank adapted to contain a material under pressure. The wall 1 is provided with an opening 2, and a generally annular patch 3 is secured by an adhesive 4 to the outer surface of the tank 1. Patch 3 has a central opening 5 positioned in alignment with the opening 2 of tank 1.

The wall 1 is formed of fibrous material impregnated with a thermosetting resin. The fibrous material can take the form of mineral fibers, such as glass or asbestos; synthetic fibers, such as nylon, Dacron, Orlon or rayon; vegetable fibers, such as cotton; animal fibers such as wool, or metal fibers such as steel. The fibrous material is preferably wound onto a cylindrical mandrel in the form of a strand or web composed of substantially continuous, unidirectional fibers. However, in some cases, braided tubing, woven fabric or randomly arranged fibers, such as matting, can be employed to fabricate the cylindrical wall.

In most applications, the fibrous strand is wound in a generally helical pattern in a number of superimposed layers to form the wall 1. By using a mandrel having rounded or curved ends, the heads of the tank can be formed integrally with the cylindrical wall of the tank. In other situations, the heads may be formed separately, either of metal or fiber reinforced resin, and bonded within the opened ends of the cylindrical wall by a suitable adhesive.

The resin employed to impregnate the fibrous material of wall 1 can be any conventional thermosetting resin, such as epoxy resins, polyester resins, alkyd resins, urea-formaldehyde resins, melamine-formaldehyde resins, and the like. The resin can be applied to the fibrous material in any suitable manner, such as spraying, dipping, brushing, doctoring or the like, and the resin can be either in the liquid uncured state or a partially cured state when the strand is wound to form the cylindrical wall.

As best shown in FIG. 2, the patch 3 has a radius of curvature which is substantially similar to that of the radius of curvature of the cylindrical wall 1 so that the patch will lie flat against the outer surface of the tank wall.

According to the invention, the patch 3 is formed of substantially continuous, unidirectional fibers which are bonded together by a thermosetting resin. The fibrous material of the patch 3 can be of a similar nature of that previously described with respect to the tank wall 1, and the thermosetting resin can be any conventional thermosetting resin. From a practical standpoint, the thermosetting resin used to bond the fibers of the patch 3 will normally be the same resin as used to fabricate the tank 1.

The fibers of the patch 3 all extend at an angle of about 63° to 69° with respect to the longitudinal axis of the cylindrical tank wall and preferably at an angle of 66°, as shown by angle A in FIG. 1. The fibers of the patch 3 can be in a series of superimposed layers, but the fibers should all be arranged at the above-mentioned angle with respect to the longitudinal axis of the tank wall. With this angularity, the fibrous patch is best able to withstand the stress created by the internal pressures within the vessel.

In addition, the diameter of the openings 2 and 5 should be not greater than ⅛ the diameter of the cylindrical tank wall 1, and the diameter of the patch 3 should be at least three times the diameter of the openings 2 and 5.

Further, the thickness of the patch should be at least twice the thickness of the tank wall 1, and the outer edge or periphery 6 of the patch should be tapered at an angle of about 45° to reduce stress concentrations about the edge of the patch.

The adhesive used to bond the patch 3 to the wall of the vessel can be any conventional adhesive such as the thermosetting resins mentioned above. The adhesive or resin 4 can be the same resin binder used to impregnate the fibrous material of wall 1 and patch 3, for a common resin system promotes the optimum bonding of the patch to the tank and thereby increases the shear strength between the adjoining surfaces of the patch and tank wall.

The reinforcing patch 3 for the opening in the filament wound cylindrical vessel wall serves to transmit the tension loads caused by internal pressures around the opening and thereby eliminates the possibility of areas of weakness being formed in the vessel wall.

The patch can be formed by any desired process to provide the necessary physical characteristics and fiber orientation. It is possible to cut the patch from a helically wound vessel or tubular member. For example, fibrous strands impregnated with a thermosetting resin can be wound about a cylindrical mandrel with the desired helix angle to provide a tubular member having the radius of curvature similar to that of tank 1. Following the curing of the resin, the tubular member can be cut to provide the patches 3 having the desired thickness, size and fiber orientation. As the patch was a part of a vessel having the same radius of curvature as the tank wall 1, the patch then will complement the curvature of the tank wall.

The patch is preferably applied as a solid circular member to the area of the vessel wall in which the opening 2 is to be located. The inner surface of the patch and the outer surface of the vessel wall are coated with the binder 4, the patch is clamped in place and the patch is heated at an elevated temperature to permit the resin to cure. Following the curing, the holes 2 and 5 are bored through the patch and the vessel wall.

As an alternative method, the hole 2 can be bored in the tank wall 1 before the patch is applied, and an annular patch 3 can then be bonded to the tank wall with the opening 5 of patch 3 aligned with hole 2 in the tank wall.

Various modes of carrying out the invention are contemplated as being within the scope of the following claims particularly pointing out and distinctly claiming the subject matter which is regarded as the invention.

We claim:

1. A structural article, comprising a cylindrical wall having a longitudinal axis and formed of a cured thermosetting resin reinforced by fibrous material, said wall having an opening therein, and an annular patch having one surface bonded to the wall and having the opposite surface exposed, said patch having an opening disposed in alignment with the opening in said wall and said patch being formed of a plurality of generally straight fibers bonded by a cured thermosetting resin with all of the fibers arranged at an angle of 63° to 69° with respect to said longitudinal axis.

2. The article of claim 1 in which the fibrous material of the wall and the fibers of said patch are formed of glass.

3. The article of claim 1 in which the patch is bonded to the outer surface of the wall and the inner surface of the patch has a radius of curvature to complement the outer surface of said wall.

4. The article of claim 3 in which the diameter of the patch is at least three times the diameter of the opening in the wall.

5. The article of claim 1 in which the thickness of the patch is at least two times the thickness of said wall.

6. The article of claim 1 in which the patch is bonded to the wall by a thermosetting resin which is the same resin used in the wall and in said patch.

7. The article of claim 4 in which the peripheral margin of the patch is tapered.

8. The article of claim 4 in which the diameter of the cylindrical wall is at least eight times the diameter of the opening in the wall.

9. The article of claim 1 in which the diameter of the patch is at least three times the diameter of the opening in the wall, and the thickness of the patch is at least two times the thickness of the vessel.

10. The article of claim 9 in which the fibers of the patch are arranged at an angle of about 66° with respect to the longitudinal axis.

References Cited

UNITED STATES PATENTS

| | | | |
|---|---|---|---|
| 3,010,602 | 11/1961 | Randolph | 220—83 |
| 3,093,160 | 6/1963 | Boggs | 138—125 XR |
| 3,106,940 | 10/1963 | Young | 138—125 |
| 3,294,271 | 12/1966 | Armbruster | 220—83 XR |

LAVERNE D. GEIGER, *Primary Examiner.*

B. KILE, *Assistant Examiner.*